United States Patent [19]

Mallows et al.

[11] Patent Number: 5,669,539

[45] Date of Patent: Sep. 23, 1997

[54] METHODS AND APPARATUS FOR FEEDING SHEET

[75] Inventors: Jeffrey Mallows; Richard William Easton; David George Hare, all of Hertfordshire; Steven James Rust, Buckinghamshire; Gary Stamp, Bedfordshire, all of United Kingdom

[73] Assignee: Crosfield Electronics Limited, Herts, United Kingdom

[21] Appl. No.: 642,605

[22] Filed: May 3, 1996

[30] Foreign Application Priority Data

May 4, 1995 [GB] United Kingdom ............ 9509064

[51] Int. Cl.⁶ .................................................. B23Q 16/00
[52] U.S. Cl. ...................... 226/24; 226/115; 226/196
[58] Field of Search ........................... 226/115, 88, 196, 226/24; 242/332, 332.1, 332.2, 332.3; 355/29, 47

[56] References Cited

U.S. PATENT DOCUMENTS

| | | | |
|---|---|---|---|
| 3,122,437 | 2/1964 | Collins | 355/47 |
| 3,494,524 | 2/1970 | Jones | 226/4 |
| 3,743,154 | 7/1973 | Brewitz | 226/196 X |
| 4,429,988 | 2/1984 | Okabe | 355/29 X |
| 4,553,825 | 11/1985 | Moulin et al. | 355/47 X |
| 4,605,300 | 8/1986 | Thaddey | 355/29 |
| 4,837,601 | 6/1989 | Nakane et al. | 355/29 X |
| 4,939,539 | 7/1990 | Shigaki | 355/29 X |
| 5,025,157 | 6/1991 | Katsuaki | 250/327.2 |
| 5,181,066 | 1/1993 | Ozawa et al. | 355/29 |

FOREIGN PATENT DOCUMENTS

| | | | |
|---|---|---|---|
| 0 213 511 | 3/1987 | European Pat. Off. | |
| 36072 | 4/1930 | France | 226/196 |
| WO 93/14441 | 7/1993 | WIPO | |

*Primary Examiner*—Daniel P. Stodola
*Assistant Examiner*—Gregory J. Strimbu
*Attorney, Agent, or Firm*—Sughrue, Mion, Zinn, Macpeak and Seas

[57] ABSTRACT

Apparatus for feeding flexible sheet (2) onto an inwardly facing curved surface (6) of an imagesetter comprises a feed system (3,4,7,8) for feeding the sheet from an input side onto and along the surface towards an output side. The feed system is also adapted to exert a force in the plane of the sheet (2) to cause the sheet to flex into conformity with the surface (6) and to form a ridge near one side. A monitoring system (12) monitors for formation of the ridge as an indication that the sheet conforms to the curved surface.

7 Claims, 2 Drawing Sheets

METHODS AND APPARATUS FOR FEEDING SHEET

FIELD OF THE INVENTION

The invention relates to methods and apparatus for feeding flexible sheet onto an inwardly facing curved surface.

DESCRIPTION OF THE PRIOR ART

A particular application with which the invention is concerned is the feeding of continuous film into an internal drum imagesetter. In that application, it is very important to ensure that the film conforms accurately with the drum surface.

SUMMARY OF THE INVENTION

In accordance with one aspect of the present invention, a method of feeding flexible sheet onto an inwardly facing curved surface comprises feeding the sheet from an input side onto and along the surface towards an output side; exerting a force in the plane of the sheet to cause the sheet to flex into conformity with the surface and to form a ridge near one side; and monitoring for formation of the ridge as an indication that the sheet conforms to the curved surface.

In accordance with a second aspect of the present invention, apparatus for feeding flexible sheet onto an inwardly facing curved surface comprises a feed system for feeding the sheet from an input side onto and along the surface towards an output side, the feed system also being adapted to exert a force in the plane of the sheet to cause the sheet to flex into conformity with the surface and to form a ridge near one side; and monitoring means for monitoring for formation of the ridge as an indication that the sheet conforms to the curved surface.

We have devised a new method and apparatus for feeding flexible sheet onto an inwardly facing curved surface which enables such sheet automatically to be fed and to be conformed with the surface without manual intervention. The invention relies on the principle that if the sheet fully conforms with the surface and its sides are urged towards each other through the plane of the sheet using circumferentially opposed forces then the sheet will buckle and form a ridge near one side and this can be monitored. If, however, the sheet were to buckle at some point along the surface then a ridge would not form near one side and the system would therefore determine that conformity had not been achieved. In effect, the ridge forms in a region where the sheet is flat (not radiused) and where the outward radial reaction to the end forces is minimal.

A (circumferential) force can be exerted in the plane of the sheet in a number of ways. In one approach, the sheet can be held stationary at the output side while the sheet continues to be fed from the input side. In a second approach, the sheet could be fed from the output side back towards the input side while it is held at the input side. This could be achieved, for example, by providing part of the feed system at the output side which can operate to feed sheet towards the input side. Conveniently, this part can also feed sheet out from the output side after imaging. In a further alternative, the sheet is fed from both input and output sides towards the other.

The feed system can conveniently be constituted by sets of pinch wheels through which the flexible sheet passes.

In some cases, laterally spaced guides are provided extending along the curved surface and between which the sheet is pushed. However, these guides are not essential.

DESCRIPTION OF THE DRAWINGS

An example of a method and apparatus according to the present invention in conjunction with a drum of an internal drum imagesetter will now be described with reference to the accompanying drawing, in which.

DETAILED DESCRIPTION OF AN EMBODIMENT

Figure 1:
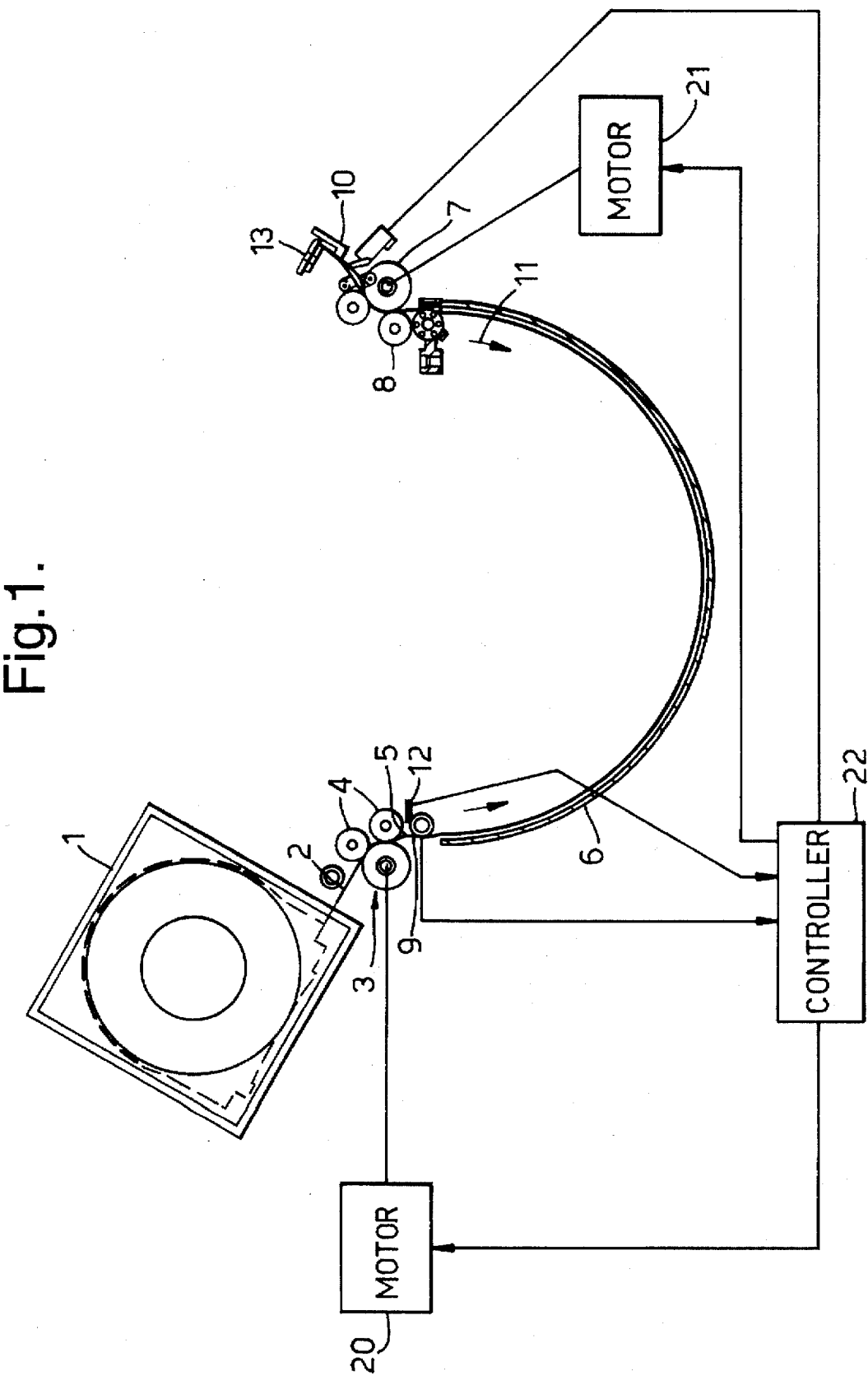
FIG. 1 is a schematic end view.

The apparatus shown in FIG. 1 comprises a supply cassette 1 containing a continuous roll of unexposed film. The film 2 is fed between a number of laterally spaced sets of opposed drive and spring loaded pressure rollers 3,4 (only one set shown) and along an angled guide plate 5 past a sensor 9 to a drum 6 of an internal drum imagesetter. Each set of rollers is formed from a single, machined piece. The pressure rollers 4 are initially separated from the drive rollers 3 to allow the film 2 to enter between them following which the pressure rollers 4 are brought into contact with the drive rollers 3 so that drive can then be imparted via the rollers 3 to the film, the rollers 3 being connected to a drive motor 20.

The drive rollers 3 are rotated to drive the film from the cassette 1 and to push it along the surface of the drum 6 until it reaches further sets of laterally spaced drive rollers 7 and cooperating spring loaded pressure rollers 8 (only one of each set shown). Again, each set is formed from a single machined piece.

The film is pushed between the pressure rollers 8 and the drive rollers 7 (as shown) and on towards a take-up cassette (not shown) of conventional form in response to rotation of the rollers 7,8, the rollers 7 being connected to a drive motor 21.

In operation, the film is manually fed out of the cassette 1 between the rollers 3,4 until it is detected by the sensor 9. The sensor 9 is connected to a controller 22 which responds by activating the motors 20,21 so that rotation of the rollers 3 pushes the film around the internal surface of the drum 6 between the rollers 7,8 following which the film is fed on into the take-up cassette.

Figure 2:
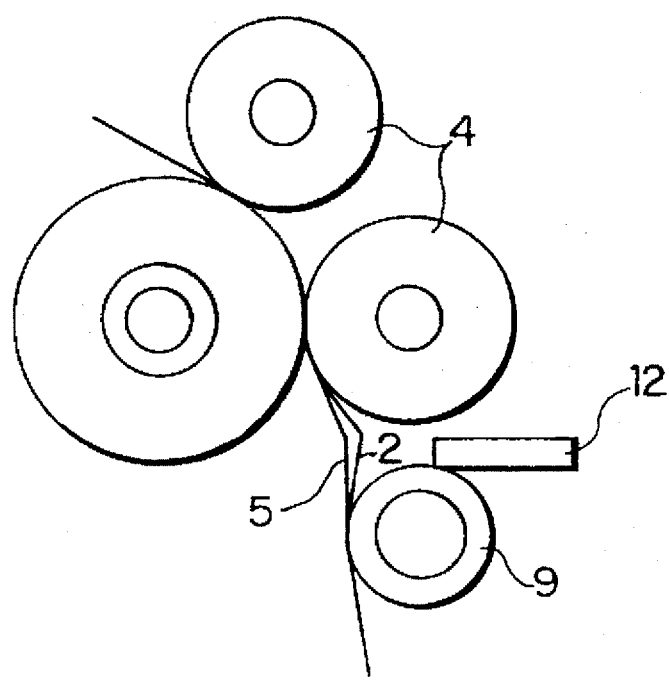
FIG. 2 is a view of one portion of the apparatus.

A sensor 10 monitors the passage of the film and is also connected to the controller 22, such as a microprocessor. Once the controller 22 has determined that a sufficient, predetermined length of film has entered the cassette, feeding of the sheet by the rollers 3,4,7,8 is stopped by stopping motors 20,21. At this point, the film 2 is securely held at the input and output sides by the rollers 3,4 and the rollers 7,8 respectively. Next, while the rollers 3,4 at the input side remain stationary the controller actuates the motor 21 so that the rollers 7,8 are operated to push the film 2 in the reverse direction as shown by an arrow 11. The film 2 has an inherent stiffness so that this reverse pushing action imparts a circumferential force which causes the film to move radially outwardly into conformity with the surface of the drum 6. Further pushing action causes the film to buckle near the input side and to form a ridge in the region of the angled plate 5, as shown in more detail in FIG. 2. A sensor 12 is provided at the input side to sense for the presence of the ridge which when sensed indicates that the film conforms with the drum surface. If, however, the film were to distort elsewhere then a ridge would not be formed near the sensor 12 as the stiffness required to move the film along its length has been lost. The controller 22 monitors the sensor 12 and provides a suitable indication of the situation to the operator. In addition, the controller 22 could cause an imaging operation to commence.

Following an imaging operation, the rollers 3,4,7,8 are activated by the controller 22 activating motors 20,21 to feed the film out of the drum and into the cassette. A guillotine 13 is provided for optionally cutting the film at this point. Otherwise, a continuous length of exposed film will be stored in the cassette.

It will be noted that the properties of the film govern when the ridge will form. Thus, a stiff material will require greater force to conform with the drum surface but will also require a greater force before the ridge develops. Thus, the invention accommodates different film or media characteristics in gaining satisfactory conformance to the drum. As the media or film is sensitive to local environmental conditions, any change in characteristics is automatically compensated for and conformance achieved.

We claim:

1. A method of feeding flexible sheet onto an inwardly facing curved surface defining input and output sides, the method comprising feeding said sheet from said input side onto and along said surface towards said output side; exerting a force in the plane of said sheet to cause said sheet to flex into conformity with said surface and to buckle to form a ridge near one side selected from said input side or said output side; monitoring for formation of said ridge as an indication that said sheet conforms to said curved surface; and, responsive to said formation of said ridge, providing an indication of the conformity of said sheet with said surface.

2. A method according to claim 1, wherein said step of exerting a force in the plane of said sheet comprises holding said sheet at said input side and exerting a force on the sheet at said output side.

3. A method according to claim 1, wherein said sheet comprises unexposed film.

4. Apparatus for feeding flexible sheet onto an inwardly facing curved surface defining input and output sides, the apparatus comprising a feed system for feeding said sheet from said input side onto and along said surface towards said output side, said feed system also being adapted to exert a force in the plane of said sheet to cause said sheet to flex into conformity with said surface and to buckle to form a ridge near one side selected from said input side or said output side; monitoring means for monitoring for formation of said ridge as an indication that said sheet conforms to the curved surface; and indication means, responsive to said formation of said ridge, for providing an indication of the conformity of said sheet with said surface.

5. Apparatus according to claim 4, wherein the feed system comprises one or more sets of pinch rollers.

6. Apparatus according to claim 5, further comprising an angled guide (5) at said input side for accommodating the formation of the ridge in said sheet.

7. An imagesetter including a drum defining an inwardly facing curved surface defining input and output sides; and apparatus for feeding film onto the inwardly facing curved surface of the drum, the apparatus comprising a feed system for feeding said sheet from said input side onto and along said surface towards said output side, said feed system also being adapted to exert a force in the plane of said sheet to cause said sheet to flex into conformity with said surface and to buckle to form a ridge near one side selected from said input side or said output side; monitoring means for monitoring for formation of said ridge as an indication that said sheet conforms to the curved surface; and indication means, responsive to said formation of said ridge, for providing an indication of the conformity of said sheet with said surface.

\* \* \* \* \*